United States Patent [19]

Bouvard

[11] 3,995,139
[45] Nov. 30, 1976

[54] FILLER MATERIAL AND PROCESS FOR THE HETEROGENEOUS WELDING BY THE FUSION OF TWO IRON-CARBON ALLOYS

[75] Inventor: Pierre Bouvard, Pont-A-Mousson, France

[73] Assignee: Centre de Recherches de Pont-a-Mousson, Pont-A-Mousson, France

[22] Filed: Dec. 24, 1974

[21] Appl. No.: 536,081

Related U.S. Application Data

[63] Continuation of Ser. No. 297,162, Oct. 12, 1972, abandoned.

[30] Foreign Application Priority Data

Oct. 18, 1971  France .............................. 71.37282

[52] U.S. Cl. ................................. 219/146; 148/24
[51] Int. Cl.² ........................................ B23K 35/22
[58] Field of Search ........... 75/123 E, 123 H, 123 J, 75/123 M; 148/24; 219/137, 145, 146

[56] References Cited
UNITED STATES PATENTS

| | | |
|---|---|---|
| 2,060,682 | 11/1936 | Miller et al. ..................... 219/146 X |
| 2,542,655 | 2/1951 | Gagnebin et al. ................. 75/123 E |
| 2,683,661 | 7/1954 | Tisdale et al. ..................... 75/123 E |
| 2,900,490 | 8/1959 | Petryck et al. .................. 219/146 X |
| 3,253,949 | 5/1966 | Larin ............................... 75/123 J |
| 3,466,422 | 9/1969 | Witherell ............................ 219/146 |
| 3,479,230 | 11/1969 | Roberts ................................ 148/24 |
| 3,539,765 | 11/1970 | Duttera et al. ...................... 219/146 |
| 3,663,212 | 5/1972 | Heine et al. .................. 75/123 M X |
| 3,778,588 | 12/1973 | Bishel ................................ 219/146 |
| 3,838,246 | 9/1974 | Asnis ................................. 219/146 |

*Primary Examiner*—J. V. Truhe
*Assistant Examiner*—N. D. Herkamp
*Attorney, Agent, or Firm*—Sughrue, Rothwell, Mion, Zinn & Macpeak

[57] ABSTRACT

Filler material and process for the heterogeneous welding by fusion of two iron-carbon alloys. The filler material comprises iron and at least one element for producing special stable carbides and at least one element for nodularizing graphite in iron.

13 Claims, 6 Drawing Figures

FILLER MATERIAL AND PROCESS FOR THE HETEROGENEOUS WELDING BY THE FUSION OF TWO IRON-CARBON ALLOYS

This is a continuation of application Ser. No. 297,162, filed oct. 12, 1972 now abandoned.

The present invention relates to the arc welding of cast iron and in particular, but not exclusively, nodular or spheroidal graphite cast irons.

It is known that in the course of the welding by fusion of lamellar graphite, nodular graphite or spheroidal graphite cast irons with a filler or added material constituted by iron or mild steel containing no alloy element other than the inevitable impurities (silicon, maganese, sulphur, phosphorus) phenomena of diffusion and dilution occur between the base metal, that is to say the metal to be welded, and the deposited metal from the filler or added material. Note that in the ensuing description the term "spheroidal" is intended to encompass also the term "nodular".

A first metallurgical consequence of these phenomena in respect of all these irons is that the carbon is diffused in the deposited metal from the base iron so that the structure of the deposited metal becomes essentially pearlitic with also free cementite which imparts thereto a high Vickers H.V. hardness exceeding 280 and poor ductility.

A second metallurgical consequence of these phenomena also results in the case of the welding of spheroidal graphite cast irons which are treated before solidification by means of a nodularization agent or a nodularizing element which tends to form spheroidal graphite, such as magnesium, cerium or any other suitable element; it resides in the diffusion of this agent in the deposited metal to the detriment of the zone of the base metal located in the immediate vicinity of the edge of the deposit. As a result of this diffusion there is a loss of nodularization agent in this zone and the latter, brought to the liquid state in the course of the welding operation, solidifies in the form of an iron whose graphite once again becomes lamellar directly as a result of the welding or after an annealing operation intended to destroy the cementite which may have formed in the course of solidification.

It has been possible to avoid the first of the drawbacks constituted by the aforementioned two consequences by adding to the filler material one or more elements such as titanium, vanadium or niobium, which fix or bind the carbon in the form of special carbides. This addition in particular permits increasing the ductility of the deposited metal and lowering its Vickers H.V. hardness to values of the order of 200 to 250 in the untreated state after deposit or subsequent to annealing.

The second of these drawbacks is more serious since it takes away any ductility from the joints obtained. The latter indeed have a tendency to fracture with a small elongation either in the course of tensile stress or in the course of bending in the zone containing the lamellar graphite which is the region of transition between the base metal, which is the spheroidal graphite cast iron, and the weld bead which is not spheroidal graphite cast iron but an iron-carbon alloy in which carbon-fixing elements are included.

The second drawback of course does not exist in welding techniques in which there is produced a weld bead of spheroidal graphite iron or nodular graphite iron between two parts of spheroidal graphite cast iron, this bead forming a welded joint which may be considered homogeneous. However, the obtainment of such a joint requires certain precautions which render the operation difficult (pre-heating to a high temperature, of the order of 500° to 650° C).

On the other hand, the obtainment of a welded joint which may be termed heterogeneous because the weld is not of spheroidal graphite iron is easier. However, to the knowledge of the Applicant, up to the present time it has not been possible to produce a reliable heterogeneous welded joint between two parts at least one of which is of spheroidal graphite cast iron. The welded joints of this type fracture in particular upon folding.

Applicant has now discovered a way of remedying said second drawback, that is to say of avoiding the loss by diffusion of the agent nodularizing the base metal into the deposited metal and of rendering a heterogeneous welded joint reliable, so that the joint does not brake upon bending, by achieving good ductility of the zones between the base metal and the weld bead.

An object of the invention is to provide a filler material for the heterogeneous welding by the fusion of two iron-carbon alloys, of the type containing essentially iron and at least one element producing special stable carbides in the deposited metal, said filler meterial comprising in addition to said element producing special stable carbides at least one element for nodularizing the graphite in the irons.

Preferably the element producing special stable carbides in the deposited metal is selected from titanium, vanadium, niobium, tantalum, zirconium, molybdenum and tungsten and among the alloys or combinations containing these bodies and, preferably, the nodularizing element is selected from magnesium, calcium, yttrium, cerium and from other rare earths and among alloys or combinations containing said bodies.

In this way there is obtained, to the Applicant's knowledge, a novel heterogeneous welded joint which conserves the graphite in its spheroidal form in the transition zones between the base metal and the weld bead, which zones are thermally affected by the welding. Under these conditions the welded joint has mechanical properties similar to those of the base metal, after annealing, so that it does not fracture upon bending.

The nodularizing elements are present in proportions which do not affect the mechanical properties of the deposited metal and which avoid or reverse the phenomena of the diffusion of the agents which nodularize the base metal towards the deposited metal.

In advantageous embodiments of the invention, the filler material contains the element producing special stable carbides in the deposited metal in proportions of 5–20% by weight of the deposited metal and the nodularizing element in proportions of 1.4 to 10%, the remainder comprising, in addition to the iron, products forming slag and protecting gas.

According to a particular embodiment, this filler material is deposited in the form of a powder between the edges of the parts to be welded, this powder being melted by any known means.

According to another particular embodiment, the filler material is supplied by a welding electrode which may be a coated rod or a filled wire.

Another object of the invention is to provide a process for the heterogeneous welding by fusion of two parts of iron-carbon alloy, comprising melting a filler material of the above-defined type between the two prepared parts.

Further features and advantages of the invention will be apparent from the ensuing description of the examples.

In the accompanying drawing, given merely by way of example,:

EXAMPLE 1

Figure 1:
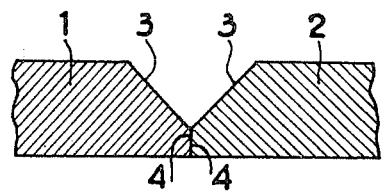
FIGS. 1, 2 and 3 illustrate three successive stages of the process according to the invention employing a filler material in the form of a powder.
Figure 2:
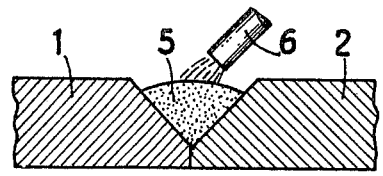
Figure 3:
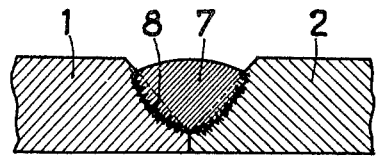

In the example shown in FIGS. 1–3, the parts to be welded 1 and 2 are of spheroidal graphite ferritic iron obtained by treatment with magnesium (nodularizing element) and they are prepared along their edge portions by a 45° chamfer 3 and a heel portion 4, the edge portions being brought close together so that the heels 4 are in abutting relation (FIG. 1).

The V-shaped groove constituted by the chamfers 3 is filled partly with a powder 5 of iron grains or particles containing 30–50% by weight of an alloy of silicon and rare earth metals (50% of silicon, 50% of mixture of cerium and other rare earths) and 10% of ferro-vanadium containing 80% of vanadium (FIG. 2). The vanadium is the agent producing the stable carbides. The mixture of cerium and other rare earths is the agent for nodularizing the graphite.

The welding is carried out by means of an electric arc with a coated electrode 6 of known type which contains and deposits iron which is as pure as possible.

The powder may also be melted by an electric arc which is produced therebetween and a non-fusible electrode of tungsten with protection by means of a neutral gas such as argon.

In view of the nature of this base metal (spheroidal graphite ferritic iron obtained by treating with magnesium) there is a certain diffusion of the nodularizing element constituted by the magnesium into the deposited metal but there is correspondingly a diffusion of the rare earth elements, which are also nodularizing elements, from the deposited metal to the base metal of the parts 1 and 2.

After graphitization and ferritization annealing (20 minutes at 950° C, slow cooling to 650° C and then cooling in air) there is found (micrograph shown in FIG. 4) a transition zone 8 between the base metal of the parts 1 and 2 and the weld bead 7. This zone is affected thermally by the welding and it has a structure composed of fine graphite nodules 9 and fine ferrite nodules 10.

The welded joint is heterogeneous since the weld bead 7 is not of spheroidal graphite iron (but of iron+titanium and vanadium carbides), whereas at least one of the parts 1 and 2 is of spheroidal graphite cast iron (normal graphite nodules 11 and ferrite nodules 12), but it has a ductility comparable with that of the spheroidal graphite cast iron.

EXAMPLE 2

In this example there is produced a coated electrode whose core is a wire of non-alloyed mild steel.

The composition of the core is as follows by weight:

| | |
|---|---|
| carbon | <0.20% |
| manganese | ≤0.50% |
| silicon | ≤0.50% |
| sulphur | <0.040% |
| phosphorus | <0.040% |
| iron | the balance |

The coating contains essentially the following ingredients (percentages by weight):
 15 – 30% of calcium carbonate,
 20 – 30% of fluor-spar,
 30 – 50% of ferro-vanadium containing 60% of vanadium,
 5 – 15% of a magnesium alloy such as nickelmagnesium containing 15% of magnesium,
 and 20 – 30% of a binder such as sodium silicate.
 These proportions are valid for a coating representing 60% by weight of the wire constituting the core of the electrode.

The parts to be welded, composed of spheroidal graphite cast iron, are prepared with a chamfer and a heel or flange as in Example 1, the parts being placed to define a gap of 2–4 mm between the heels.

Figure 5:
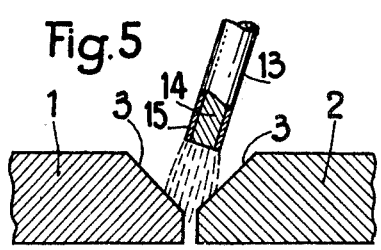
FIGS. 5 and 6 are views similar to FIG. 2 illustrating a process according to the invention employing a filler material in the form of a coated rod and a filled wire respectively.

The weld is made (FIG. 5) by an electrode 13 (core 14 and coating 15) having one of the foregoing compositions, after pre-heating to a minimum of 150° C.

Figure 4:
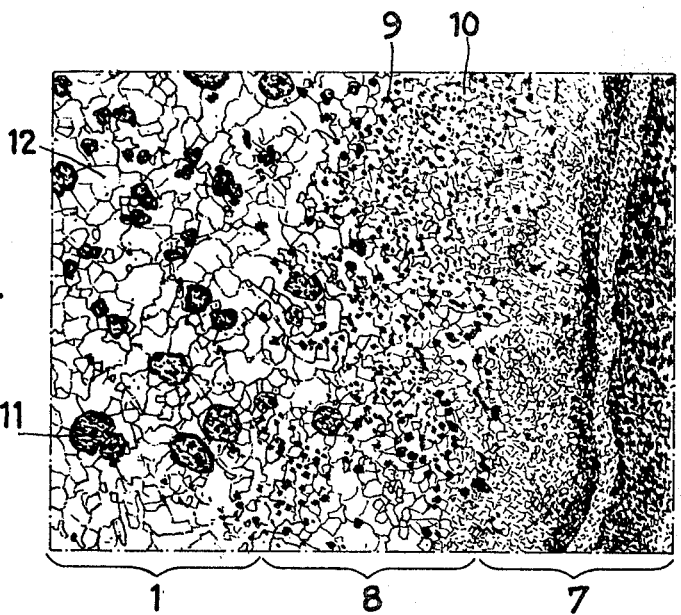
FIG. 4 shows a micrographic view (magnification 100 ×) of the intermediate zone between the base metal and the weld bead in a joint welded by a process according to the invention.

The structure of the transition zone 8 after graphitization and ferritization annealing is identical to that shown in FIG. 4. The weight of deposited metal is found to be equal to 110% of the weight of the wire constituting the core of the electrode. Analysis shows that the filler material constituted by the electrode contains vanadium (element generating stable carbides) and magnesium (nodularizing element) in mean proportions of 13% of vanadium and 1.2% of magnesium with respect to the weight of deposited metal.

EXAMPLE 3

In this example, there is employed a coated electrode similar to that of Example 2 but in which the nodularizing magnesium alloy is replaced by 6–16% by weight of a nodularizing alloy of silicon and rare earths (50% of silicon, 25% of cerium, 25% of other rare earths) and 0–10% of ferro-titanium containing 50% of titanium.

Thus, the composition of the agents producing special stable carbides is reinforced since there is added to the ferro-vanadium ferro-titanium jointly with the nodularizing alloy. The titanium performs the function of both a deoxidizer and an agent forming special carbides.

The welding of the parts of spheroidal graphite ferritic iron is carried out under the same conditions as in Example 2.

The structure of the transition zones 8 after graphitization and ferritization annealing is that shown in FIG. 4.

The joints obtained have, after annealing, remarkable mechanical properties:
 their tensile strength exceeds or equals 40 hectobars;
 their elongation exceeds or equals 8%;

the Vickers HV hardness of the weld bead is 200–230 whereas that of the base metal of the welded parts is 140–180;

the joints can withstand a bending test carried out at 180° on a machined bar around a mandrel having a diameter 9e, e being the thickness of the machined bar.

The filler material contains, on average, with respect to the weight of the deposited metal: 2.7% of nodularizing elements and 12% of carbon fixing elements.

EXAMPLE 4

In this example, the 6–15% of silicon and rare earths of Example 3 are replaced by 6-15% by weight of ferrosilicon containing 40% of silicon and 6–15% of rare earth fluoride. The electrode obtained permits depositing a weld bead of improved outer appearance.

The filler material contains, on average, with respect to the weight of the deposited metal: 2.7% of nodularizing agents and 12% of agents producing special carbides.

EXAMPLE 5

In this example, there is employed an electrode having a core of an iron-vanadium alloy containing 8–16% by weight of vanadium which may be cast or drawn and a basic coating containing by weight:
 20 – 35% of calcium carbonate,
 20 – 35% of fluor-spar,
 0 – 10% of ferro-titanium containing 40% titanium,
 10 – 20% of an alloy containing 50% of silicon and 50% of rare earths,
 15 – 30% of a binder such as potassium silicate.

These proportions are valid for a coating representing 40% of the weight of the wire constituting the core of the electrode.

The weight of the deposited metal is found to be substantially equal to the weight of the core of the electrode.

EXAMPLE 6

Figure 6:
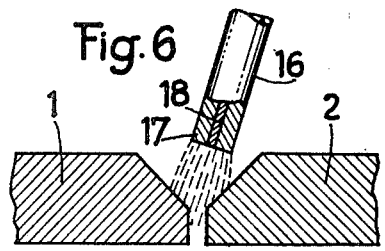

In this example, for the purpose of producing welded joints with or without gaseous protection, there is prepared a filled tubular wire 16 (FIG. 6) whose outer case 17 has the same composition as the core 14 of the electrode of example 2 but whose core 18 has the following composition, expressed as percentages of the total weight of the wire:
 3 – 7% of a mixture of calcium carbonate and sodium carbonate,
 2 – 6% of fluor-spar,
 3 – 7% of titanium oxide,
 10 – 20% of ferro-vanadium containing 80% of vanadium,
 and 3 – 10% of an alloy containing 50% of silicon and 50% of rare earths.

The weight of the deposited metal corresponds to substantially 80% of the total weight of the wire. The filler material contains, on average, 15% of vanadium and 3.8% of rare earths with respect to the weight of the metal.

The mechanical characteristics of the welded joints of example 3 are as those of examples 1, 2 and 4–6.

Other examples of carrying out the process according to the invention may be produced by employing as the element producing stable carbides: niobium, tantalum, zirconium, molybdenum, tungsten in the form of ferrous alloys or mixtures or combinations, and by employing other metals as nodularizing element, such as calcium and rare earths other than cerium, such as yttrium, in the form of pure bodies or mixtures or combinations.

It is essential to note that the filler material, the welding process and the electrodes according to the invention may be advantageously employed not only for assembling parts of pearlitic or ferritic spheroidal graphite cast iron but also for producing reliable joints between parts having spheroidal graphite and parts of steel and between parts of lamellar graphite cast iron.

Having now described my invention what I claim as new and desire to secure by Letters Patent is:

1. A coated electrode for the heterogeneous welding by fusion of two iron-carbide alloys, the coated electrode comprising a centre core of nonalloyed mild steel of the following composition by weight:

| | |
|---|---|
| carbon | <0.20% |
| manganese | ≤0.50% |
| silicon | ≤0.50% |
| sulphur | <0.040% |
| phosphorus | <0.040% |
| iron | balance | and a coating representing 60% by weight of the core and containing by weight 16–30% of an element producing special stable carbides and 5–15% of a nodularizing element.

2. A coated electrode as claimed in claim 1, wherein the coating of the electrode contains by weight:
 15–30% of calcium carbonate,
 20–30% of fluor-spar,
 30–50% of ferro-vanadium containing 60% of vanadium,
 5–15% of an alloy of magnesium containing 15% of magnesium and 20–30% of a binder.

3. A coated electrode as claimed in claim 1, wherein the coating of the electrode contains by weight:
 15–30% of calcium carbonate,
 20–30% of fluor-spar,
 30–50% of ferro-vanadium containing 60% of vanadium,
 6–15% of an alloy of silicon and rare earths comprising 50% of silicon and 50% of cerium and other rare earths,
 0–10% of ferro-titanium containing 50% of titanium and 20–30% of a binder.

4. A coated electrode as claimed in claim 1, wherein the coating of the electrode contains by weight:
 15–30% of calcium carbonate,
 20–30% of fluor-spar,
 30–50% of ferro-vanadium containing 60% of vanadium,
 6–15% of ferro-silicon containing 40% of silicon,
 6–15% of fluoride of rare earths,
 0–10% of ferro-titanium containing 50% of titanium and 20–30% of a binder.

5. A coated electrode for the heterogeneous welding by fusion of two iron-carbide alloys, the coated electrode comprising a centre core of an iron-vanadium alloy containing 8–15% of vanadium and a coating representing 40% by weight of the core and containing by weight:
 20–35% of calcium carbonate,
 20–35% of fluor-spar,
 0–10% of ferro-titanium containing 40% of titanium, 10–20% of an alloy comprising 50% of silicon and 50% of rare earths,
15–30% of a binder such as potassium silicate.

6. A filled tubular wire for the heterogeneous welding by fusion of two iron-carbide alloys, the filler tubular wire comprising a core having the following composition, with respect to the total weight of the filled wire:
3–7% of a mixture of calcium carbonate and sodium carbonate,
2–6% of fluor-spar,
3–7% of titanium oxide,
10–20% of ferro-vanadium containing 80% of vanadium,
3–10% of an alloy containing 50% of silicon and 50% of rare earths,
and a case of non-alloyed mild steel having the following composition by weight:

| | |
|---|---|
| carbon | <0.20% |
| manganese | ≦0.50% |
| silicon | ≦0.50% |
| sulphur | <0.040% |
| phosphorus | <0.040% |
| iron | balance. |

7. A welding rod or wire for the heterogeneous welding by fusion of two iron-carbide alloys and consisting essentially of iron as a major component, at least one element for producing special stable carbides and at least one element for nodularizing graphite in iron.

8. A welding rod or wire as claimed in claim 7, wherein the element producing special stable carbides is selected from the group consisting of: titanium, vanadium, niobium, tantalum, zirconium, molybdenum and tungsten, alloys thereof and combination thereof.

9. A welding rod or wire as claimed in claim 7 wherein the nodularizing element is selected from the group consisting of: magnesium, calcium, yttrium, cerium and other rare earth elements and alloys thereof and combinations thereof.

10. A welding rod or wire for the heterogeneous welding by fusion of two iron-carbide alloys and having an inner core part and an outer layer part, and consisting essentially of iron as a major component, at least one element for producing special stable carbides and at least one element for nodularizing graphite in iron, the iron being contained in one of said parts and the special carbide-producing element and the nodularizing element being substantially wholly contained in the other of said parts.

11. A welding rod or wire as claimed in claim 10, containing relative to the weight of metal deposited by the welding, 5–20% of element producing special carbides, 0.4–10% of nodularizing element, the remainder comprising products forming slag and protective gas in addition to the iron.

12. A welding rod or wire for use in the heterogeneous welding by fusion of spheroidal graphite or nodular graphite cast iron consisting of:
 a. iron;
 b. slag and protective gas-forming compounds;
 c. 5–20% by weight of at least one carbide-producing element selected from the group consisting of titanium, vanadium, niobium, tantalum, zirconium, molybdenum, tungsten, alloys thereof, and combinations thereof, the weight percent being based on the total weight of the metal deposited by the welding; and
 d. 0.4–10% by weight of at least one nodularizing element selected from the group consisting of magnesium, calcium, yttrium, cerium, and other rare earth elements, alloys thereof, and combinations thereof, the weight percent being based on the total weight of the metal deposited by the welding,
 e. said filler material containing less than 0.2% of carbon.

13. A welding rod or wire for use in the heterogeneous welding by fusion of spheroidal graphite or nodular graphite cast iron consisting of:
 a. iron;
 b. slag and protective gas-forming compounds;
 c. 5–20% by weight of at least one carbideproducing element selected from the group consisting of titanium, vanadium, niobium, tantalum, zirconium, molybdenum, tungsten, alloys thereof, and combinations thereof, the weight percent being based on the total weight of the metal deposited by the welding; and
 d. 0.4–10% by weight of at least one nodularizing element selected from the group consisting of magnesium, calcium, yttrium, cerium, and other rare earth elements, alloys thereof, and combinations thereof, the total weight percent being based on the total weight of the metal deposited by the welding.

* * * * *